W. M. CRUMP.
COTTON AND PEANUT PLANTER.
APPLICATION FILED NOV. 30, 1907.
932,001.
Patented Aug. 24, 1909.
2 SHEETS—SHEET 1.
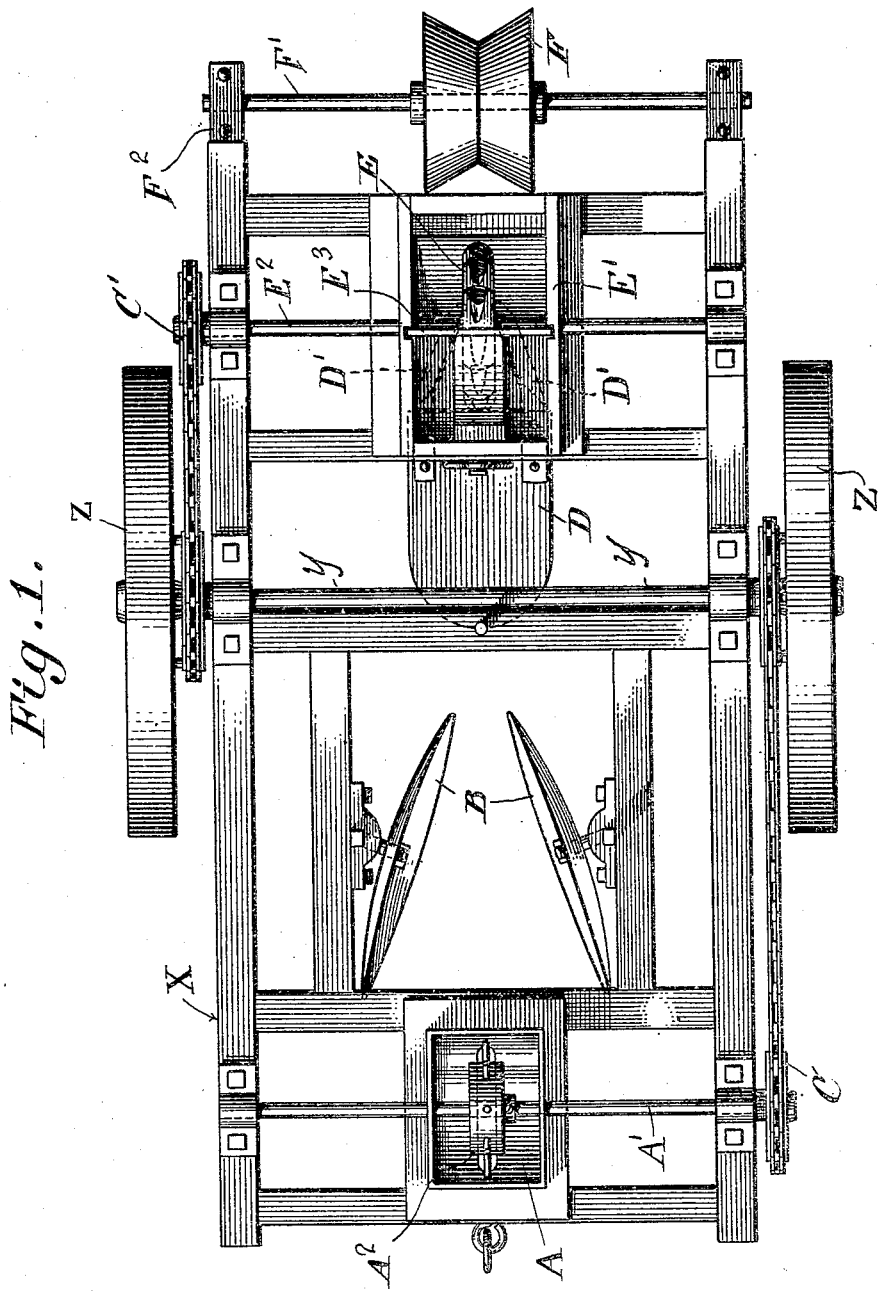
Witnesses:
Inventor:

W. M. CRUMP.
COTTON AND PEANUT PLANTER.
APPLICATION FILED NOV. 30, 1907.
932,001.
Patented Aug. 24, 1909.
2 SHEETS—SHEET 2.
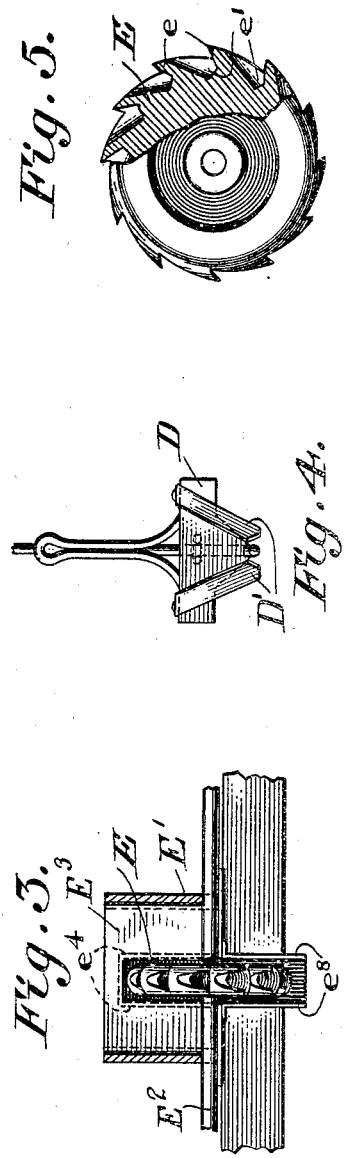
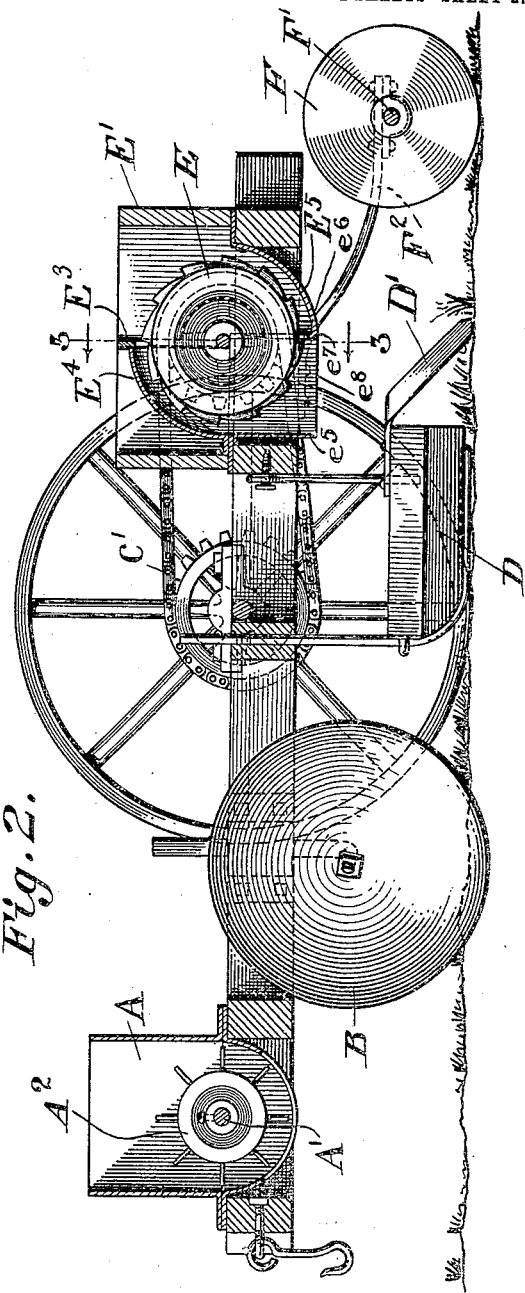
Witnesses:
Inventor:

UNITED STATES PATENT OFFICE.

WALTER MASON CRUMP, OF FRIES, VIRGINIA.

COTTON AND PEANUT PLANTER.

932,001.   Specification of Letters Patent.   Patented Aug. 24, 1909.

Application filed November 30, 1907. Serial No. 404,632.

*To all whom it may concern:*

Be it known that I, WALTER M. CRUMP, a citizen of the United States, residing at Fries, in the county of Grayson, State of Virginia, have invented certain new and useful Improvements in Cotton and Peanut Planters; and I do hereby declare the following to be a full, clear, and exact description of the invention, such as will enable others skilled in the art to which it appertains to make and use the same.

The present invention has reference to improvements in seed-droppers and it resides, broadly speaking, in the provision of an extremely simple and effective mechanism of that class designed for operative connection with the axle of a planting machine, the feed wheel which forms the chief element of the mechanism having a series of peripheral pockets wherein the seeds collect during the rotation of the wheel and from which they are subsequently discharged into the furrow formed by the opener.

Briefly described, the dropper wheel is provided with a peripheral series of tooth-shaped projections, each having formed therein an inwardly-extending cup-shaped cavity which opens through the upper wall thereof and through the front wall of the succeeding tooth, the pockets being formed by the teeth and their cavities.

The preferred embodiment of the invention is illustrated in the accompanying drawings, in which corresponding parts are designated by the same reference letters throughout the several views.

Of the said drawings, Figure 1 is a plan view of the complete machine. Fig. 2 is a longitudinal sectional view thereof. Fig. 3 is a section taken on the line 3—3 of Fig. 2. Fig. 4 is a detail view of the combined furrow opener and coverer employed. Fig. 5 is a side view, partly in section of the dropper wheel.

Referring more particularly to the drawings, X designates, in a general manner, the frame of the machine, Y the axle, and Z the ground wheels secured to the ends of the latter, the propulsion of the machine being effected in any desired manner.

At the front end of the machine is located a fertilizer distributer hopper A, operated by a chain and sprocket connection C between the axle Y and the shaft A' to which the distributing wheel $A^2$ is secured. Rearwardly of the distributer, there is located a pair of rotatable disks B arranged to turn up the soil upon opposite sides of the fertilizer, so as to form a covering ridge. Rearwardly of the ridger, in turn, there is located the combined furrow opener and coverer shown in Fig. 4, the first mentioned member D serving to cut a trench in the member which is subsequently closed by the ridge which is subsequently closed by the coverer D'. This latter member consists of a pair of rearwardly extending converging blades. Directly above these blades, and slightly to the rear of the opener D is positioned the seed dropper, whose principal member is the wheel E. This wheel, as shown in Fig. 5, is provided with a peripheral series of projections $e$ which in shape and arrangement, resemble the teeth of a ratchet wheel. Each projection $e$ has formed therein an inwardly extending cup-shaped cavity $e'$ which opens through the upper wall thereof and through the front wall of the succeeding projection. The bottom walls of these cavities are overhung to a slight extent by their upper walls, this being effected by tapering the openings in the upper walls. The projections and their cavities form the seed pockets.

The wheel E which is located within the seed hopper E' is secured to a transverse shaft $E^2$ driven by a chain and sprocket connection C' with the axle Y. The hopper E' just referred to is mounted upon the rear cross-beams of the frame X and has located therewithin a removable partition plate $E^3$ and upper and lower casings $E^4$ and $E^5$, the partition plate straddling the wheel. The upper casing is located within the front portion of the hopper and is U-shaped in cross section, so as to permit the wheel to extend into the space between the sides $e^4$ thereof, the front portion of said casing being formed on a curve concentric with the wheel. The casing $E^5$ into which the lower portion of the wheel projects has its vertical front wall $e^5$ alining with the lower terminals of the curved front wall of the casing $E^4$. The bottom wall of said casing $E^5$ is open at its forward portion, while the rear portion $e^6$ of said wall is curved upwardly and rearwardly similarly to the curved wall of the upper casing, the lower or front edge of said curved portion being bent directly upward, as indicated by the reference character $e^7$. The curved walls of these two casings form guides, as will be apparent, since they are located sufficiently close to the teeth of the dropper wheel to insure the pockets being initially filled and subsequently emptied directly into the trench. The upbent edge $e^7$ of the wall $e^6$ of the lower casing tends to prevent the seeds from escaping between said wall and the wheel teeth, while the plain front wall $e^5$ of said lower casing together with the side walls $e^8$ thereof form a discharge chute located directly above the trench. As the seeds fall into the trench, the latter is closed by the covering blades D' which are connected to the opener D and are located upon opposite sides of the trench. These blades are inclined downwardly and inwardly and converge toward their rear ends, as shown in Figs. 2 and 4. The closed trench or furrow is finally subjected to the action of a presser roll F carried by a horizontally-disposed transverse shaft F' journaled in brackets secured to the rear ends of a pair of heavy leaf-springs $F^2$ bolted at their front ends to the rear ends of the side beams of the frame X.

The operation of the machine, as a whole, is thought to be apparent from the foregoing, and an extended description thereof is accordingly omitted, it being necessary only to state that as the dropper wheel E is rotated within the hopper, its pockets will be successively filled and their contents carried around and subsequently emptied directly through the discharge chute into the trench. Also that during such rotation, the seed in the pockets cannot escape therefrom until after the pockets pass the partition plate $E^3$, owing to the inward inclination of the pockets, and that the formation of the projections e with curved or oppositely beveled upper walls causes all of the seeds which do not actually enter the pockets to fall back into the hopper, thus preventing the seeds from clogging the space between the projections e and the lower edge of the connecting portion of the plate $E^3$ and interfering with the movement of the wheel.

What is claimed is:—

1. In combination, a hopper, a partition arranged vertically within said hopper transversely to its longitudinal axis, oppositely-disposed upper and lower curved casings extending from said partition to the opposite ends of the hopper, whereby a diagonal passage is formed therethrough, a dropper wheel mounted in the aforementioned diagonal passage with its vertical diameter coinciding with the vertical partition of the hopper and its periphery parallel and adjacent to the oppositely-disposed upper and lower curved casings, said dropper wheel being provided with a peripheral series of projections, each formed with an inwardly-extending seed-receiving cavity opening longitudinally through the upper wall thereof, said wall overhanging the bottom wall of the cavity at opposite sides of the opening, and slanting at opposite sides to prevent the seeds from lodging thereupon.

2. In combination, a hopper, a partition arranged vertically within said hopper transversely to its longitudinal axis, oppositely-disposed upper and lower curved casings extending from said partition to the opposite ends of the hopper, whereby a diagonal passage is formed therethrough, a one-piece dropper wheel mounted in the aforementioned diagonal passage with its vertical diameter coinciding with the vertical partition of the hopper and its periphery parallel and adjacent to the oppositely-disposed upper and lower curved casings, said dropper wheel being provided with a peripheral series of projections, each formed with an inwardly-extending seed-receiving cavity opening longitudinally through the upper wall thereof, said wall overhanging the bottom wall of the cavity at opposite sides of the opening, and slanting at opposite sides to prevent the seeds from lodging thereupon.

WALTER MASON CRUMP.

Witnesses:
HARVEY M. TODD,
D. B. MATTHEWS.